United States Patent [19]
Goodwin, III

[11] Patent Number: 5,694,418
[45] Date of Patent: Dec. 2, 1997

[54] SYSTEM AND METHOD FOR DETERMINING EPL MESSAGE TRANSMISSION RETRIES

[75] Inventor: John C. Goodwin, III, Suwanee, Ga.

[73] Assignee: NCR Corporation, Dayton, Ohio

[21] Appl. No.: 490,039

[22] Filed: Jun. 13, 1995

[51] Int. Cl.$^6$ .................................................. H04B 1/38
[52] U.S. Cl. ............... 375/219; 375/227; 375/285; 375/296; 455/63; 455/67.3; 340/825.15; 371/34; 364/478.03; 364/478.13; 364/479.08; 235/378
[58] Field of Search ............... 375/219, 224, 375/227, 259, 285, 296, 346, 347; 340/825.06, 825.07, 825.15, 825.17, 825.35, 825.69; 235/383, 385, 472, 375, 378; 455/52.1–54.2, 63, 65, 67.3, 67.4; 364/403, 478.03, 478.13, 479.08; 371/32–35

[56] References Cited

U.S. PATENT DOCUMENTS

| | | |
|---|---|---|
| 4,589,111 | 5/1986 | Adachi ........................ 371/32 |
| 4,817,115 | 3/1989 | Campo et al. .................. 375/238 |
| 5,483,676 | 1/1996 | Mahany et al. ................. 455/67.4 |

OTHER PUBLICATIONS

Robert H. Deng et al., An Adaptive Coding Scheme with Code Combing for Mobile Radio Systems, IEEE Transactions on Vehicular Technology, vol. 42, No. 4, Nov. 1993, pp. 469–476.

*Primary Examiner*—Stephen Chin
*Assistant Examiner*—Amanda T. Le
*Attorney, Agent, or Firm*—Paul W. Martin

[57] ABSTRACT

A system and method which determines a number of electronic price label (EPL) data message transmission attempts to an EPL. A transmitter transmits a data message to the EPL. A receiver receives a return signal from the EPL. A storage system stores a status flag representing a first number of times the data message is transmitted by the transmitter to the EPL, the status flag being based upon an established signal to noise (S/N) ratio. A communication base station (CBS) determines a new S/N ratio from the return signal. A runtime analyzer program determines whether the new S/N ratio is below a range of S/N ratios that includes the established S/N ratio, and if it is, provides a new status flag representing a second number of transmission times greater than the first number of transmission times. The transmitter transmits a subsequent data message the second number of times.

3 Claims, 3 Drawing Sheets

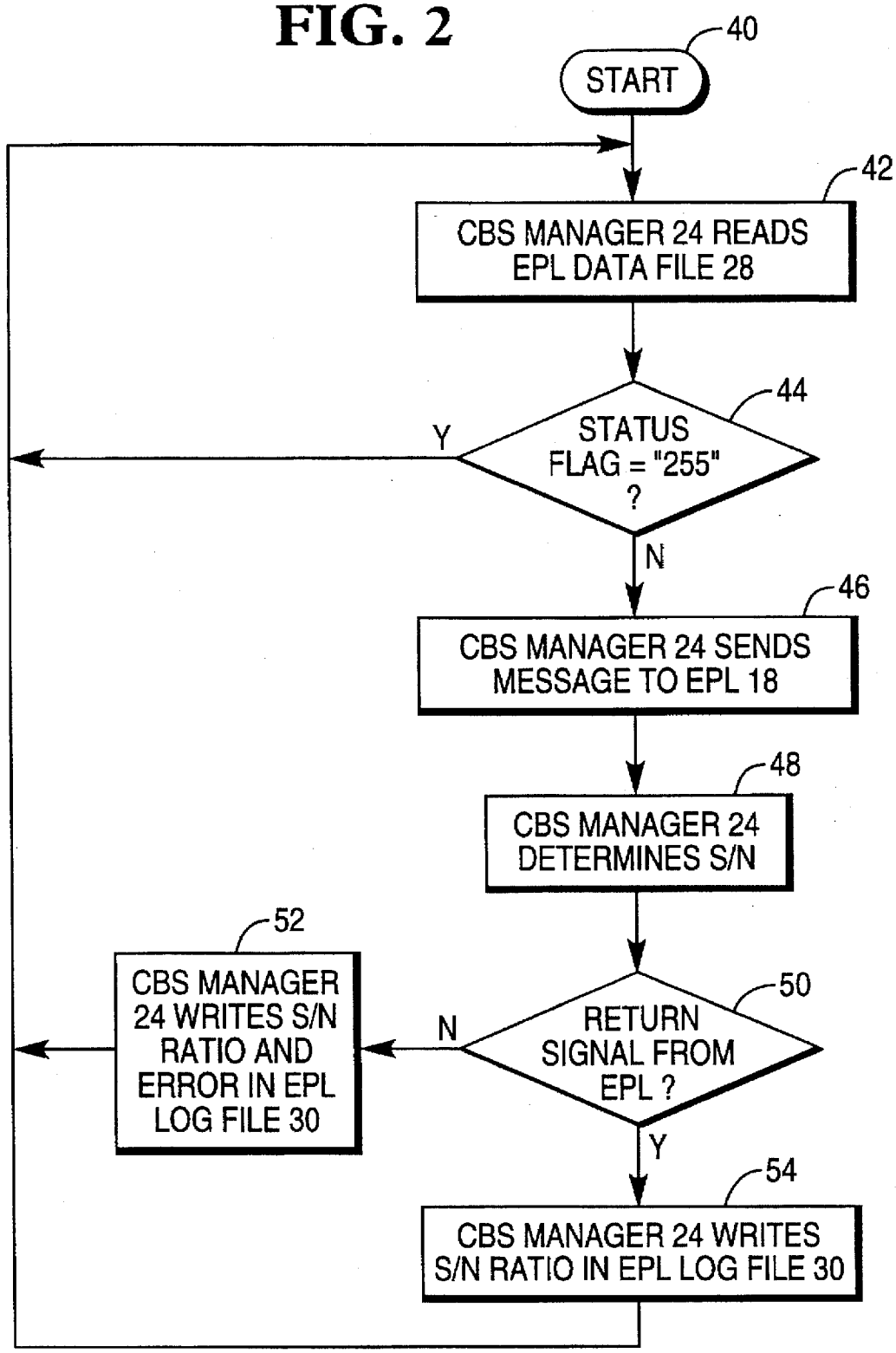

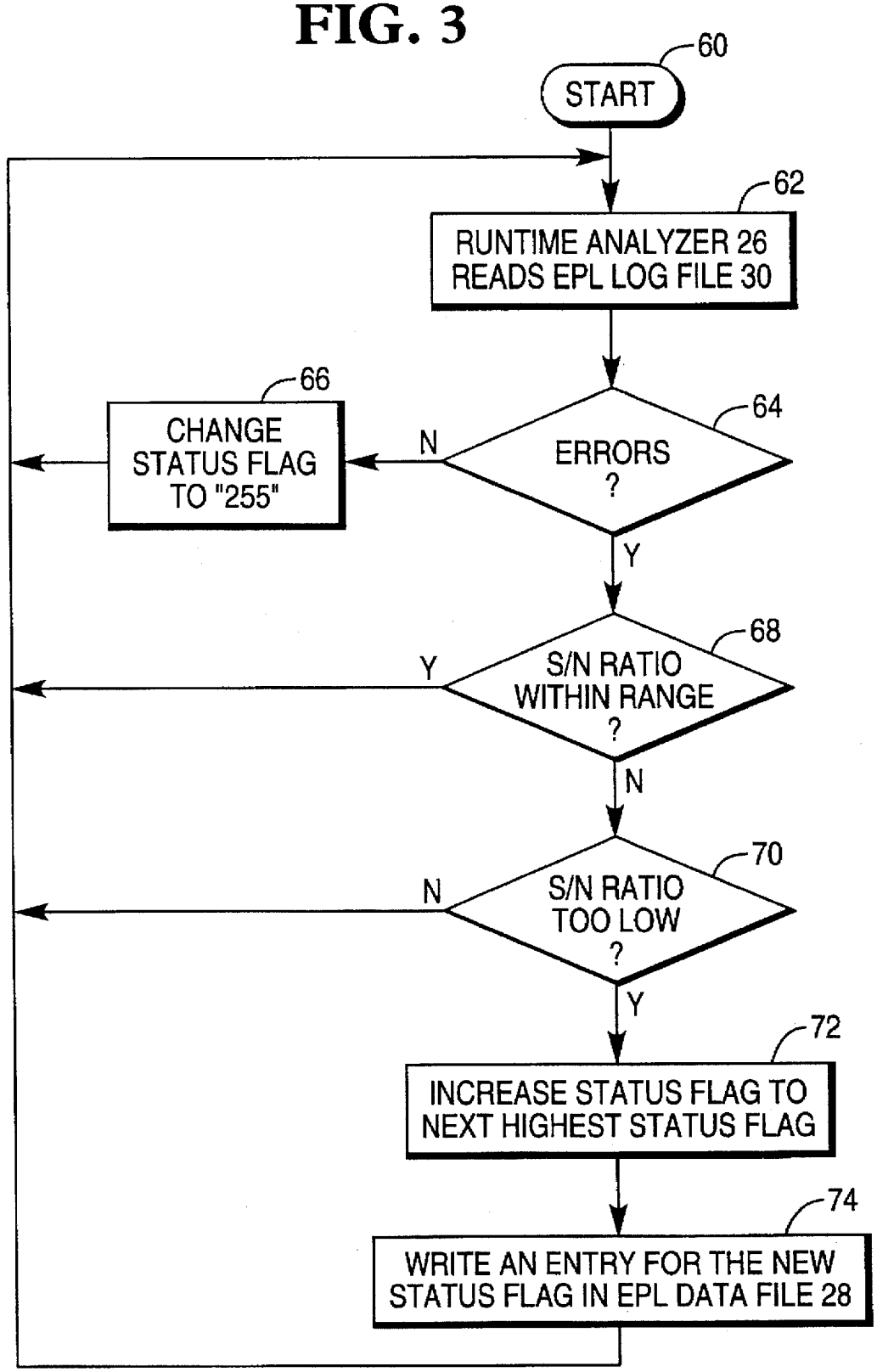

SYSTEM AND METHOD FOR DETERMINING EPL MESSAGE TRANSMISSION RETRIES

BACKGROUND OF THE INVENTION

The present invention relates to electronic price label (EPL) systems, and more specifically to a system and method for determining EPL message transmission retries in a runtime environment.

EPL systems typically include a plurality of EPLs for each merchandise item in a store. EPLs display the price of corresponding merchandise items on store shelves and are typically attached to a rail along the leading edge of the shelves or directly to the shelves. A store may contain thousands of EPLs to display the prices of the merchandise items. The EPLs are coupled to a central server from where information about the EPLs is typically maintained in an EPL data file. The EPL data file contains EPL identification information, EPL merchandise item information, and a price checksum. Price information displayed by the EPLs is obtained from the PLU file.

Messages sent from the central server to the EPLs are affected by noise levels in the EPL system. When the noise level associated with a particular EPL is too high, price changes are not received by the EPL.

Therefore, it would be desirable to provide a method for monitoring the noise levels associated with EPLs and determining the number of message transmission retries which are necessary to deliver messages to the EPLs.

SUMMARY OF THE INVENTION

In accordance with the teachings of the present invention, a system and method for determining EPL message transmission retries are provided. A transmitter transmits a data message to an EPL. A receiver receives a return signal from the EPL. A storage system stores a status flag representing a first number of times the data message is transmitted by the transmitter to the EPL, the status flag being based upon an established signal to noise (S/N) ratio. A communication base station (CBS) determines a new S/N ratio from the return signal. A runtime analyzer program determines whether the new S/N ratio is below a range of S/N ratios that includes the established S/N ratio, and if it is, provides a new status flag representing a second number of transmission times greater than the first number of transmission times. The transmitter transmits a subsequent data message the second number of times.

A method for transmitting data includes the steps of storing a status flag representative of a first number of transmissions of a data message to the EPL in an EPL data file, reading the status flag from the EPL data file, transmitting the data message the first number of times, receiving a return signal from the EPL, determining a signal to noise (S/N) ratio from the return signal, determining whether the S/N ratio is below a range of S/N ratios that are associated with the status flag, providing a new status flag representative of a second number of data message transmissions and writing the new status flag in the EPL data file if the S/N ratio is below the range of S/N ratios, and transmitting a subsequent set of data messages the second number of times.

It is accordingly an object of the present invention to provide a system and method for determining EPL message transmission retries.

It is another object of the present invention to provide a system and method for determining EPL message transmission retries which works automatically.

It is another object of the present invention to provide a system and method for determining EPL message transmission retries which can also determine whether an EPL is functioning properly.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a flow diagram illustrating the operation of the CBS manager under the method of the present invention; and FIG. 3 is a flow diagram illustrating the operation of the runtime analyzer under the method of the present invention.

DETAILED DESCRIPTION OF THE PREFERRED EMBODIMENT

Figure 1:
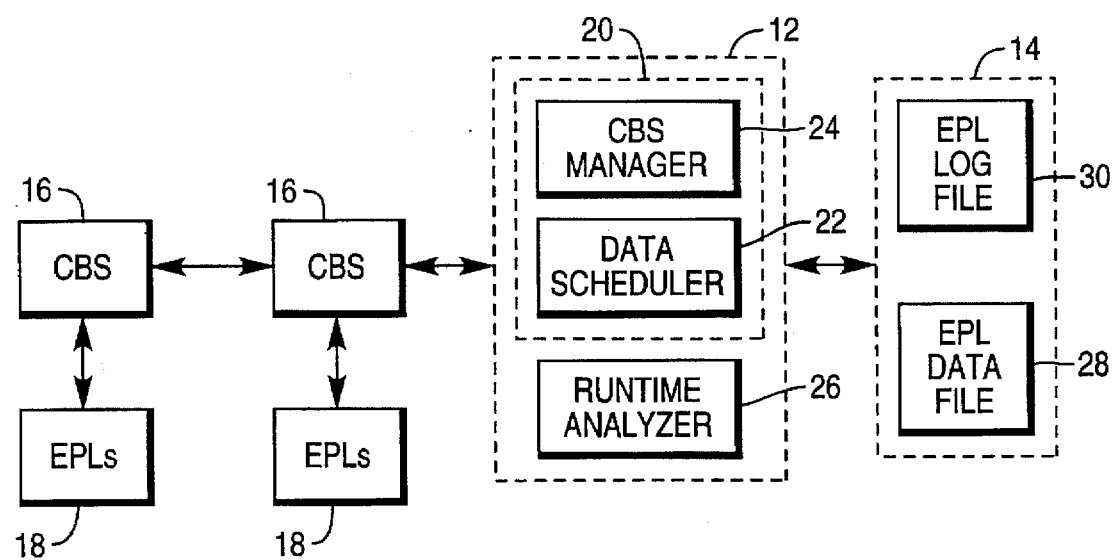
FIG. 1 is a block diagram of an EPL system.

Referring now to FIG. 1, EPL system 10 includes computer 12, storage medium 14, communication base stations (CBSs) 16, and electronic price labels (EPLs) 18.

Computer 12 executes EPL interface software 20, which records, schedules, and transmits price changes to EPLs 18 through CBSs 16, and receives and analyzes status messages from EPLs 18 through CBSs 16. EPL interface software 20 uses EPL data file 28, which contains item information, identification information, item price verifier information, and status information for each of EPLs 18.

CBSs 16 are preferably coupled in series to each other and to computer 12 through wire cables. CBSs 16 each include a transmitter and receiver for wirelessly communicating with EPLs 18.

EPL interface software 20 primarily includes data scheduler 22 and CBS manager 24. Data scheduler 22 schedules EPL price change messages to be sent to EPLs 18 through CBSs 16 via CBS manager 24.

CBS manager 24 schedules the actual transmission of price change messages to EPLs 18 and the reception of status messages from EPLs 18 for predetermined time slots. In order to schedule transmissions and receptions, CBS manager 24 reads the status flag from EPL data file 28. Although, CBS manager 24 may also receive status information from an executing application. Status flags are organized in accordance with the information in Table I:

TABLE I

| Status Flag | Interpretation |
|---|---|
| 0 | EPL is inactive. |
| 1 | 1 send, then 1 receive |
| 2 | 2 sends, then 2 receives |
| 4 | 4 sends, then 4 receives |
| 8 | 8 sends, then 8 receives |
| 16 | 16 sends, then 16 receives |
| 255 | EPL faulty |

Thus, for example, a status flag of "4" tells CBS manager 24 to request all of CBSs 16 to transmit a price change to one of EPLs 18 in four different time frees. Each frame contains twelve time slots managed by CBS manager 24 and CBSs 16. CBS manager 24 listens for a response from the one EPL in the four time frames. If the response comes into CBS manager 24 in any of the first, second, or third time frames, the remaining time frames are reported. CBS manager 24 writes the number of time frames required to receive a response from the one EPL in EPL log file 30.

CBS manager 24 monitors signal strength and noise information during each response time frame. It records signal-to-noise (S/N) ratio information for each EPL in EPL log file 30 if the first attempt fails.

CBS manager 24 also performs transmission retries if the first transmission attempt fails. CBS manager 24 temporarily promotes the EPL to a higher retry status and attempts to communicate with the EPL again. CBS manager logs a status message following the communication attempt. This status message includes the status (Good or Bad) and S/N ratios for further analysis at a later time by runtime analyzer 26.

Computer 12 also executes runtime analyzer 26 which reads the status flag and S/N data in EPL log file 30 and makes determinations that may result in the status flag of a particular one of EPLs 18 being changed. Runtime analyzer 26 determines peak and average S/N ratios for each of EPLs 18, and establishes S/N thresholds and ranges for each status flag. Runtime analyzer 26 reads log file 30 for the measured S/N ratio to determine whether it is too low, and if it is, changes the status flag. To do this, runtime analyzer 26 compares the recorded S/N ratio with a predetermined S/N range associated with the recorded status flag. If the recorded ratio is not within the predetermined S/N range, runtime analyzer 26 determines the correct range and status flag and modifies EPL data file 28 accordingly.

Runtime analyzer 26 is preferably run continuously to reset the system and re-initialize runtime analyzer 26, unless computer 12 is involved within processor-intensive tasks, such as batch processing.

Storage medium 14 contains EPL data file 28 and EPL log file 30.

Turning now to FIG. 2, the operation of CBS manager 24 is explained in more detail, beginning with START 40.

In step 42, CBS manager 24 reads EPL data file 28 for the status flag of an EPL 18.

In step 44, CBS manager 24 (or an application program) determines whether the status flag is equal to "255" or "0". If so, then CBS manager returns to step 42 to read data for another EPL 18.

If the status flag is not equal to "255" or CBS manager 24 sends a scheduled message to EPL 18 in accordance with the status flag in step 46. Thus, if the status flag is equal to "2", CBS manager 24 sends the message twice and waits up to two time slots for a return signal.

In step 48, CBS manager 24 waits for a return signal from EPL 18, and determines the S/N ratio.

In step 50, if CBS manager 24 does not receive a return signal, then CBS manager 24 writes an error and the S/N ratio in EPL log file 30 in step 52, and returns to step 42.

If CBS manager 24 receives a return signal, CBS manager 24 writes the S/N ratio in EPL log file 30 in step 54, and returns to step 42.

Turning now to FIG. 3, the operation of runtime analyzer 26 is explained in more detail, beginning with START 60.

In step 62, runtime analyzer 26 reads EPL log file 30 for the S/N ratio and error messages for a particular EPL 18.

In step 64, runtime analyzer 26 determines whether an error message exists for EPL 18. If an error message exists, runtime analyzer 26 changes the status flag of EPL 18 to "0" or "255" in step 66.

If EPL log file 30 does not contain errors for the EPL, runtime analyzer 26 determines whether the S/N ratio is within the range of S/N ratios that are associated with the status flag in step 68. If it is, then runtime analyzer 26 returns to step 62 to process another of EPLs 18.

If it is not, runtime analyzer 26 determines whether the S/N ratio is too low in step 70. If it is, then runtime analyzer 26 increases the status flag to the next highest status flag in step 72, writes the new status flag in EPL data file 28 in step 74, and returns to step 62 to process another of EPLs 18. Decreasing the status flag results in less time being required to interrogate EPL 18.

If the S/N ration is not too low, the method returns to step 62.

Advantageously, automatic retry analysis and retry status setting allow system 10 to automatically adjust and be reconfigured to the store environment. Batch or short interval procedures for setting the retry status do not. The invention allows system 10 to adjust itself to interferences outside the control of a store or system 10, and allows the store to more easily move EPLs 18 around within the store and system 10.

Although the present invention has been described with particular reference to certain preferred embodiments thereof, variations and modifications of the present invention can be effected within the spirit and scope of the following claims.

I claim:

1. A method for transmitting data to an electronic price label (EPL) comprising the steps of:

storing a status flag representative of a first number of transmissions of a data message to the EPL in an EPL data file;

reading the status flag from the EPL data file;

transmitting the data message the first number of times;

receiving a return signal from the EPL;

determining a signal to noise (S/N) ratio from the return signal;

determining whether the S/N ratio is below a range of S/N ratios that are associated with the status flag;

providing a new status flag representative of a second number of data message transmissions and writing the new status flag in the EPL data file if the S/N ratio is below the range of S/N ratios; and transmitting a subsequent set of data messages the second number of times.

2. A method for transmitting data to an electronic price label (EPL) comprising the steps of:

transmitting a data message to the EPL a first number of times based upon an established signal to noise (S/N) ratio;

receiving a return signal from the EPL;

determining a new (S/N) ratio from the return signal;

determining whether the new S/N ratio is below a range of S/N ratios that includes the established S/N ratio; and transmitting a subsequent data message to the EPL a second number of times based upon the new S/N ratio if the new S/N ratio is below the range of S/N ratios.

3. An electronic shelf label system comprising:

a transmitter which transmits a data message to an EPL;

a receiver which receives a return signal from the EPL;

a storage system which stores a status flag representing a first number of times the data message is transmitted by the transmitter to the EPL, wherein the status flag is based upon an established signal to noise (S/N) ratio;

means for determining a new S/N ratio from the return signal; and means for determining whether the new S/N ratio is below a range of S/N ratios that includes the established S/N ratio, and if it is, providing a new status flag representing a second number of transmission times greater than the first number of transmission times;

wherein the transmitter transmits a subsequent data message the second number of times.

\* \* \* \* \*